(12) United States Patent
Barlett et al.

(10) Patent No.: US 8,282,273 B2
(45) Date of Patent: Oct. 9, 2012

(54) BLACKBODY FITTING FOR TEMPERATURE DETERMINATION

(75) Inventors: Darryl Barlett, Dexter, MI (US); Barry D. Wissman, Ann Arbor, MI (US); Charles A. Taylor, II, Ann Arbor, MI (US)

(73) Assignee: k-Space Associates, Inc., Dexter, MI (US)

( * ) Notice: Subject to any disclaimer, the term of this patent is extended or adjusted under 35 U.S.C. 154(b) by 395 days.

(21) Appl. No.: 12/730,432

(22) Filed: Mar. 24, 2010

(65) Prior Publication Data
US 2010/0246631 A1 Sep. 30, 2010

Related U.S. Application Data (60) Provisional application No. 61/162,698, filed on Mar. 24, 2009.

(51) Int. Cl.
*G01K 15/00* (2006.01)
*G01J 5/00* (2006.01)
(52) U.S. Cl. ............................. 374/2; 374/121
(58) Field of Classification Search ............... 374/2, 121
See application file for complete search history.

(56) References Cited

U.S. PATENT DOCUMENTS

| | | | |
|---|---|---|---|
| 4,767,219 A | 8/1988 | Bibby | |
| 4,924,478 A | 5/1990 | Tank | |
| 4,974,182 A | 11/1990 | Tank | |
| 5,099,121 A | 3/1992 | Allen | |
| 5,118,200 A | 6/1992 | Kirillov et al. | |
| 5,132,922 A | 7/1992 | Khan et al. | |
| 5,377,126 A | 12/1994 | Flik et al. | |
| 5,388,909 A | 2/1995 | Johnson et al. | |
| 5,501,637 A | 3/1996 | Duncan et al. | |
| 5,568,978 A | 10/1996 | Johnson et al. | |
| 5,653,539 A | 8/1997 | Rosengaus | |
| 5,772,323 A * | 6/1998 | Felice | 374/127 |
| 5,823,681 A | 10/1998 | Cabib et al. | |
| 5,876,121 A | 3/1999 | Burns et al. | |
| 6,116,779 A | 9/2000 | Johnson et al. | |
| 6,179,465 B1 | 1/2001 | Yam | |
| 6,379,038 B1 * | 4/2002 | Felice | 374/128 |
| 6,481,886 B1 | 11/2002 | Narendrnath et al. | |
| 6,738,724 B2 | 5/2004 | McIntosh | |
| 7,517,144 B2 | 4/2009 | Miteva et al. | |
| 2003/0161380 A1 | 8/2003 | Hauenstein | |
| 2004/0240517 A1 | 12/2004 | Howard | |

(Continued)

OTHER PUBLICATIONS k-Space Associates, Inc., Techical Note, The truth behind today's wafer temperature methods: Band-edge thermometry vs. emissivity-corrected pyrometry, Jun. 2006, pp. 1-2.

(Continued)

*Primary Examiner* — Christopher Fulton
(74) *Attorney, Agent, or Firm* — Endurance Law Group PLC (57) ABSTRACT

A temperature monitoring technique for collecting radiation intensity (blackbody emission) across a broad wavelength range. A solid state spectrometer (26) acquires spectra from a sample (10) in real time and resolves the spectra to a radiation intensity (I) versus wavelength ($\lambda$) curve. This curve is fitted to Planck's equation using a non-linear least squares fitting analysis. The system can be configured to self-calibrate and then lock in an amplitude value (A) which is used in subsequent temperature measurements by fitting to the blackbody emission curve. Preferably, the spectrometer (26) is flat field corrected (36) in an initial step to counteract variations in the spectrometer response with wavelength.

20 Claims, 8 Drawing Sheets

U.S. PATENT DOCUMENTS

2007/0071064 A1 3/2007 Miteva et al.
2010/0103976 A1* 4/2010 Liebmann .......................... 374/2
2010/0232470 A1* 9/2010 Timans .............................. 374/2
2011/0112772 A1* 5/2011 Yost et al. ........................ 702/24

OTHER PUBLICATIONS k-Space Associates, Inc., New Technology Note, kSA BandiT Blackbody Temperature Measurement, Nov. 2008, pp. 1-4.

* cited by examiner

Spectra Wavelength (nanometers)

FIG. 8

Spectra Wavelength (nanometers)

FIG. 9

BLACKBODY FITTING FOR TEMPERATURE DETERMINATION

CROSS REFERENCE TO RELATED APPLICATIONS

This application claims priority to Provisional Patent Application No. 61/162,698, filed Mar. 24, 2009, the entire disclosure of which is hereby incorporated by reference and relied upon.

BACKGROUND OF THE INVENTION

1. Field of the Invention

The invention relates generally to methods for making precise non-contact temperature measurements of a sample based on its thermally-emitted radiation, as well as methods for calibrating such a temperature measurement device.

2. Related Art

Many advanced manufacturing processes depend on the ability to control the temperature of a sample with high precision and repeatability. However, use of contact-based measurement techniques is often impractical. As one example, thin film and semiconductor deposition processes used for manufacturing electronic and optical devices require very precise control of substrate temperatures to yield high quality products, but the temperature measurements must be taken with equipment located entirely outside of the deposition chamber. As another example, molecular beam epitaxy (MBE) is used as a method to precisely deposit ultra-pure elements like gallium or arsenic in many advanced electronic applications. It is not feasible to use contact-based thermometry in these situations either, even though the quality of the manufacturing process depends upon temperatures being held to tight tolerances. Indeed, many other applications exist in which precise real-time temperature monitoring and/or controls are needed, but must be accomplished with non-contact measuring instruments.

Several methods for non-contact temperature monitoring have been proposed. One very common method is based on a form of pyrometry, for example, in which radiation intensity from the sample is detected in a specific wavelength range. Using known mathematical equations like Planck's law, the detected radiation intensity can be correlated to sample temperature via a fundamental relationship between the emission signal and the sample temperature. For a given temperature, these emission characteristics over all wavelengths (that is over the blackbody spectrum—BB) obey Planck's law. Planck's law states that the spectral radiance at any wavelength for a given temperature conforms to the mathematical equation:

$$I(\lambda, T) = A \frac{2hc^2}{\lambda^5} \frac{1}{e^{hc/\lambda k_B T} - 1} + C$$

Where:
- $I(\lambda,T)$=spectral radiance as a function of wavelength and temperature
- T=the temperature in Kelvin
- $\lambda$=the wavelength
- A=the amplitude variable which is a product of the emissivity of the sample and a tooling factor
- h=Planck's constant
- c=the speed of light
- $k_B$=Boltzmann's constant
- e=the base of the natural logarithm and
- C=a constant offset or background.

When plotted, this mathematical equation yields a predictable emission intensity curve versus wavelength for any given temperature. This relationship forms the basis of standard pyrometry. Thus, standard pyrometry relies on measuring the integrated light intensity for a fixed time period over a narrow wavelength range. Standard pyrometry approaches assume that the sample emissivity will not change over time, that the sample is opaque at the measurement wavelength, and that no other intensity contributions or attenuations exist from non-sample related sources (e.g., from viewport coatings, stray filament radiation, and the like).

Such standard pyrometry techniques prove inadequate to address many of today's highly sophisticated manufacturing processes that require consideration for stray light, emissivity changes during deposition, viewport coating buildups, and the like. Also, the standard pyrometry techniques require some type of in-situ calibration on a routine basis to compensate for chamber-dependent factors. When monitoring temperature for semiconductor materials, for example, it is also important to collect signal intensity information for pyrometry at a wavelength where the material is opaque, i.e., above the material's band gap or band edge.

Another non-contact thermometry technique may include monitoring the band gap absorption edge from a sample and correlating the temperature-dependent band gap to the sample temperature via empirically-derived data.

An improvement on the standard pyrometry technique, known as emissivity-correcting pyrometry (ECP), may be seen by reference to U.S. Pat. No. 5,377,126 to Flik et al., issued Dec. 27, 1994. The Flik patent incorporates a methodology by which changes in sample surface emissivity are factored into the temperature determination equations.

Figure 3:
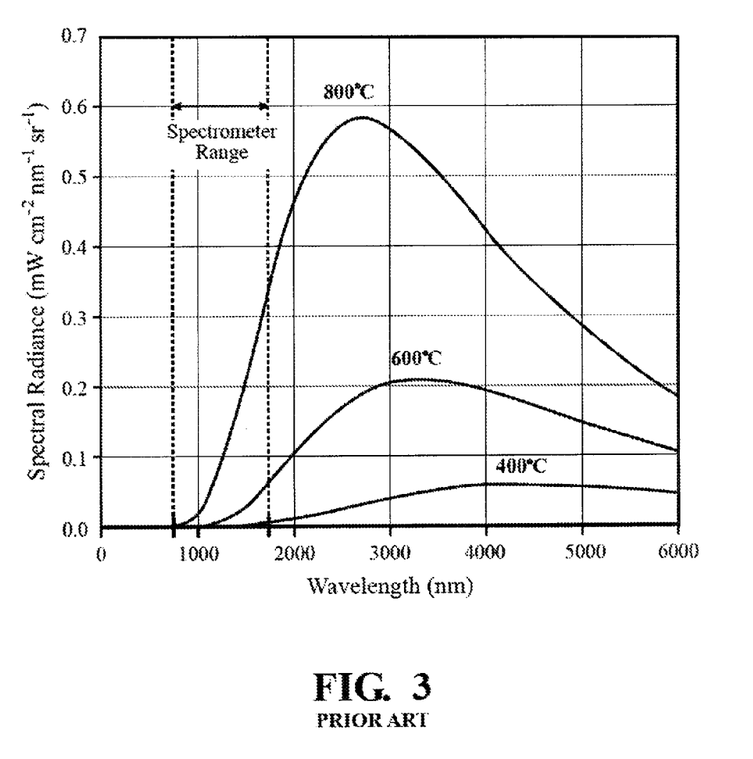
FIG. 3 is a graph showing spectral radiance of a blackbody versus temperature for several different temperatures.
Figure 4:
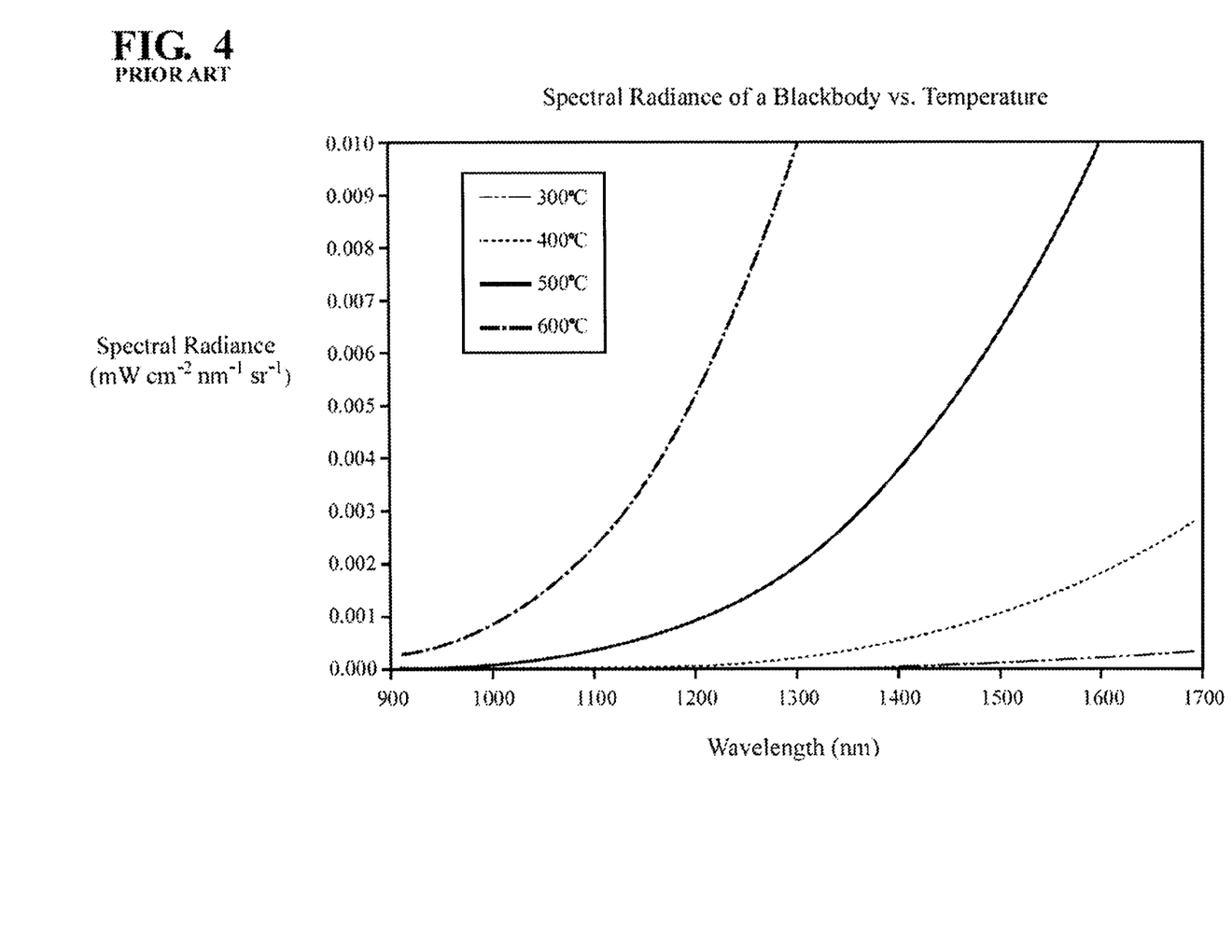
FIG. 4 is a graph describing spectral radiance of a blackbody versus temperature within the spectral range of 900-1,700 nm.

A still further type of non-contact temperature determination, distinct from pyrometry but somewhat related in approach, is the so-called blackbody fitting technique. This method allows non-contact measurement of a sample's temperature by acquiring wavelength-dependent spectra from the heated sample and then matching that spectra to a blackbody radiation curve calculated by a mathematical equation based on Planck's law (as given above). The spectral radiance is the fundamental measure of the amount of light emitted from a diffuse source that can reach a spectrometer or other suitable detector. Spectral radiance is defined as the emitted power per unit area of emitting surface, per unit solid angle, per unit wavelength (mW cm$^{-2}$ nm$^{-1}$ sr$^{-1}$). For example, FIG. 3 describes a plot of the spectral radiance of an ideal blackbody for several temperatures. Note that every spectral radiance curve is unique for a given temperature, i.e., the curves defined by Planck's mathematical equation never cross. Furthermore, the peak of each curve shifts toward shorter wavelengths as the temperature increases. The wavelength of the peak radiance obeys Wien's displacement law:

$$\lambda_{max} = \frac{b}{T}$$

where the constant b=2.8978×10$^6$ nm K. Note that in the temperature range for many advanced manufacturing processes, the peak of the radiance curve lies in the mid-IR (infrared) portion of the spectrum. Thus, using standard spectrometer technology, most temperature measurements are based on fitting to the short-wavelength exponential tail below the peak. This is exemplified in FIG. 3 where the broken vertical lines between 900 and 1,700 nm represent an approximate detection range for a standard solid state spectrometer. Thus, it is within this range that spectra data are acquired and analyzed by the blackbody fitting technique to determine the temperature of a sample.

An early example of the blackbody fitting technique may be seen by reference to U.S. Pat. No. 5,132,922 to Khan et al., issued Jul. 21, 1992. The entire disclosure of U.S. Pat. No. 5,132,922 is hereby incorporated by reference. This patent performs either a non-linear (in the case of the full Planck distribution function) or a linear (in the case of the Wien approximation) least squares fit of the acquired spectral data to the appropriate function. By design, this technique requires an estimate or functional form of the emissivity versus wavelength dependence for whatever blackbody/graybody is being measured. A particular drawback in the concept described in this patent is its functional dependence on the emissivity of the sample being measured. This dependence on emissivity has the practical effect of introducing measurement errors. Such errors arising from the use of estimated wavelength and temperature-dependent emissivity are noted in U.S. Pat. No. 6,738,724 to Macintosh, issued May 18, 2004. The entire disclosure of U.S. Pat. No. 6,738,724 is hereby incorporated by reference. U.S. Pat. No. 6,738,724, in turn, requires that different surface areas and spectral regions of the radiation source be imaged onto different spectrometer channels via computer-controlled auto-focus and auto-zoom optical elements, and via waveguide cables. This is an exceedingly complicated approach which is cumbersome and likely to introduce substantial errors in the temperature measurement process.

This, as with the other prior art systems, creates difficulties in real world applications of the technology. One such shortcoming is a general failure to adequately address variations in spectrometer response with wavelength. That is, prior art systems fail to adequately correct for variations in the spectrometer that may be present across the entire spectra such as, for example, due to the inherent response of the optical components. Another shortcoming inherent in these prior art approaches to temperature measurement arises out of the necessity to first calibrate the measurement system to some external reference before actual temperature measurements can be made. Such external references might derive from a band edge measurement or RHEED transition, or by other suitable thermometry techniques. Thus, the pyrometry and blackbody fitting techniques of the prior art are not self-sufficient as a means for determining sample temperature, but rather must be paired with another type of measurement system for at least an initial calibration phase. This, of course, increases the cost and complexity of manufacturing processes that need thermometry data for proper operation. Also, this initial calibration step usually requires elevating the sample temperature to a high level, introducing time delay and reducing efficiencies in the manufacturing processes.

Accordingly, there is a need in the art for improved techniques of non-contact temperature measurements using blackbody fitting methods which do not suffer from the aforementioned spectral response variations, and further, which are not dependent upon initial calibration using a supplemental measurement technique.

SUMMARY OF THE INVENTION

The invention provides a method for calibrating a spaced, non-contact temperature measurement device by observing thermally-emitted radiation from a sample. According to this method, a spectrometer and a sample to be measured are provided. The sample is heated to an unknown self-calibration temperature where the wavelength-dependent spectra emitted by the sample is acquired with a spectrometer. A mathematical equation is provided defining ideal blackbody spectral radiance as a non-linear function of wavelength and temperature. This mathematical equation includes an unsolved amplitude variable (A). The mathematical equation expresses a unique ideal blackbody spectral radiance curve for any given temperature and amplitude value (A). The one ideal blackbody spectral radiance curve which most closely corresponds to the acquired spectra data is selected. The absolute temperature which corresponds to the ideal blackbody spectral radiance curve is adopted for the unknown temperature of the sample and its corresponding amplitude value (A) is stored. With this stored amplitude value (A), new sample temperature measurements can be made by acquiring new wavelength-dependent spectra from a heated sample (either the same or a different sample) in the infrared portion of the spectrum with the spectrometer, and then calculating a new sample temperature by solving the mathematical equation using the newly acquired spectra and the stored amplitude value (A) as a known factor rather than a variable.

According to this method, relatively simple, straightforward, and robust self-calibration techniques can be employed by effectively "free fitting" the first acquired spectra in such a way that it takes into account any emissivity variations over time. This self-calibrating technique allows application of fairly standard fitting routines to obtain the best possible fit of the acquired data to an ideal blackbody spectral radiance curve.

According to another aspect of this invention, a method is provided for making precise non-contact temperature measurements of a sample based on its thermally-emitted radiation. Again, a spectrometer and sample to be measured are provided. Wavelength-dependent spectra from the heated sample in the IR portion of the spectrum is acquired with the spectrometer. A mathematical equation is provided defining ideal blackbody spectral radiance as a non-linear function of wavelength and temperature. The mathematical equation expresses a unique ideal blackbody spectral radiance curve for any given temperature. One ideal blackbody spectral radiance curve that closely corresponds to the acquired spectral data is selected and its corresponding absolute temperature is adopted as the unknown temperature of the sample. According to this method, prior to the selecting step, the acquired spectra is corrected by a predetermined correction factor to account for any variations in the spectrometer response with wavelength.

According to this aspect of the invention, a flat field correction of the spectrometer is incorporated to address potential variations from one spectrometer device to the next. Variation may be due to particular optical components, sensor design, and/or other conditions. However, by first correcting the spectral data prior to selecting an ideal blackbody spectral radiance curve that closely corresponds, a more accurate temperature determination is achieved.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
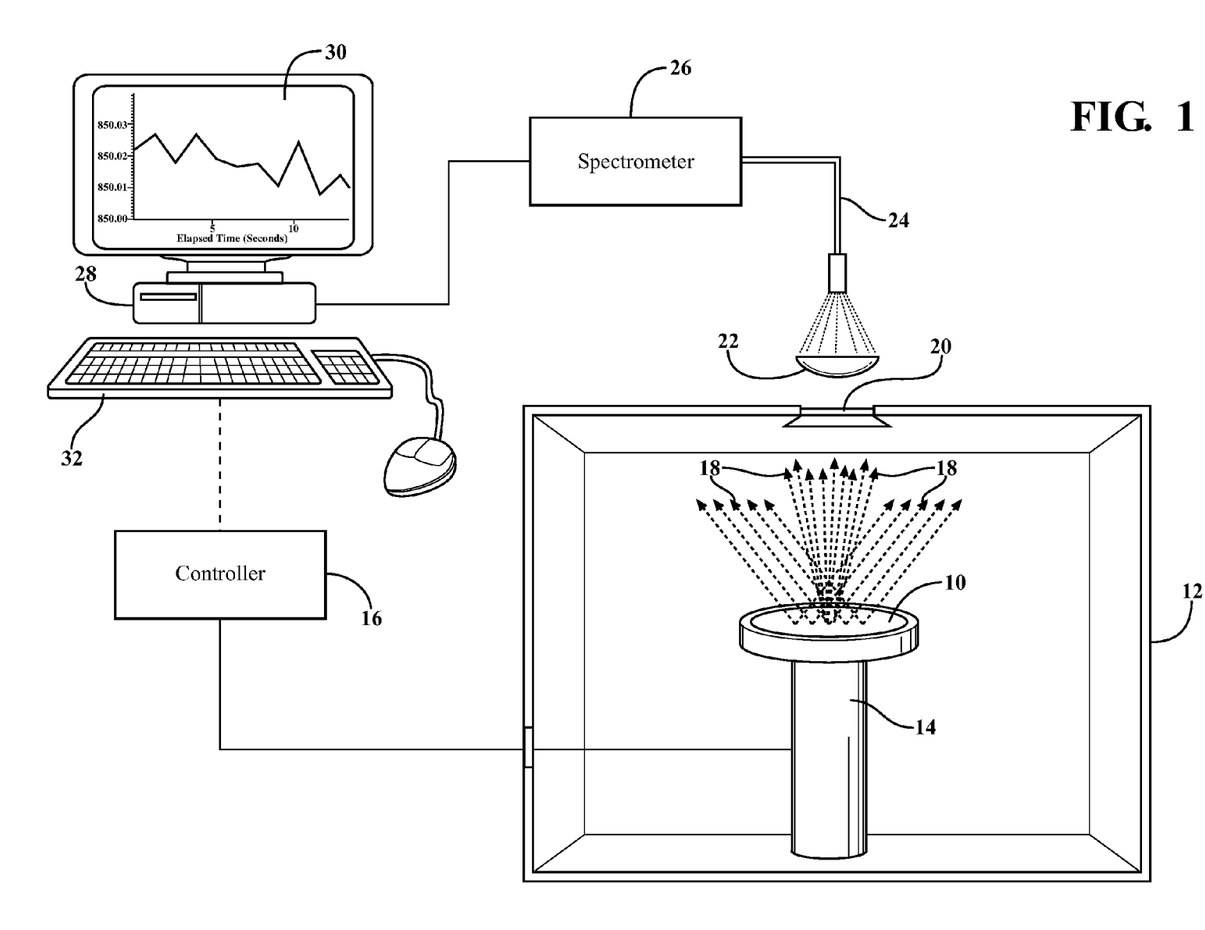
FIG. 1 is a schematic view of an exemplary thin film deposition process including a temperature measurement system according to the subject invention.

Referring to the figures wherein like numerals indicate like or corresponding parts throughout the several views, an exemplary application of the subject invention is illustrated schematically in FIG. 1 within the context of a thin film deposition process. In this case, the sample 10 may comprise a thin film substrate or wafer of the type used to manufacture semiconductors. The sample 10 is located within a deposition chamber 12. The sample 10 is associated with a heater 14 capable of being switched on and off by a controller 16 so as to elevate the sample 10 to an appropriate processing temperature and then maintain the sample 10 at a desired temperature throughout the deposition process. The heated wafer sample 10 emits radiation depicted by broken arrows 18 which passes through a viewport window 20 to a lens 22. The lens 22 directs the emitted radiation 18 to an optical fiber 24 which is operatively associated with a solid state spectrometer 26. The spectrometer 26 is used to measure the properties of the emitted radiation 18 over a specific portion of the electromagnetic spectrum, typically in the range of 900-1,700 nm, although other ranges may be available depending upon the particular attributes of the spectrometer. Of course, the 900-1,700 nm range is associated with the infrared (IR) portion of the spectrum. Based on the radiation input 18, the spectrometer 26 produces raw spectra data which is then communicated to a computer processing device 28 which may include a display screen 30 and/or keyboard input feature 32. The computer 28 is configured to execute the methods of this invention so as to calculate, in substantially real time, the temperature of the sample 10 based on an analysis of its thermally-emitted radiation 18.

Figure 2:
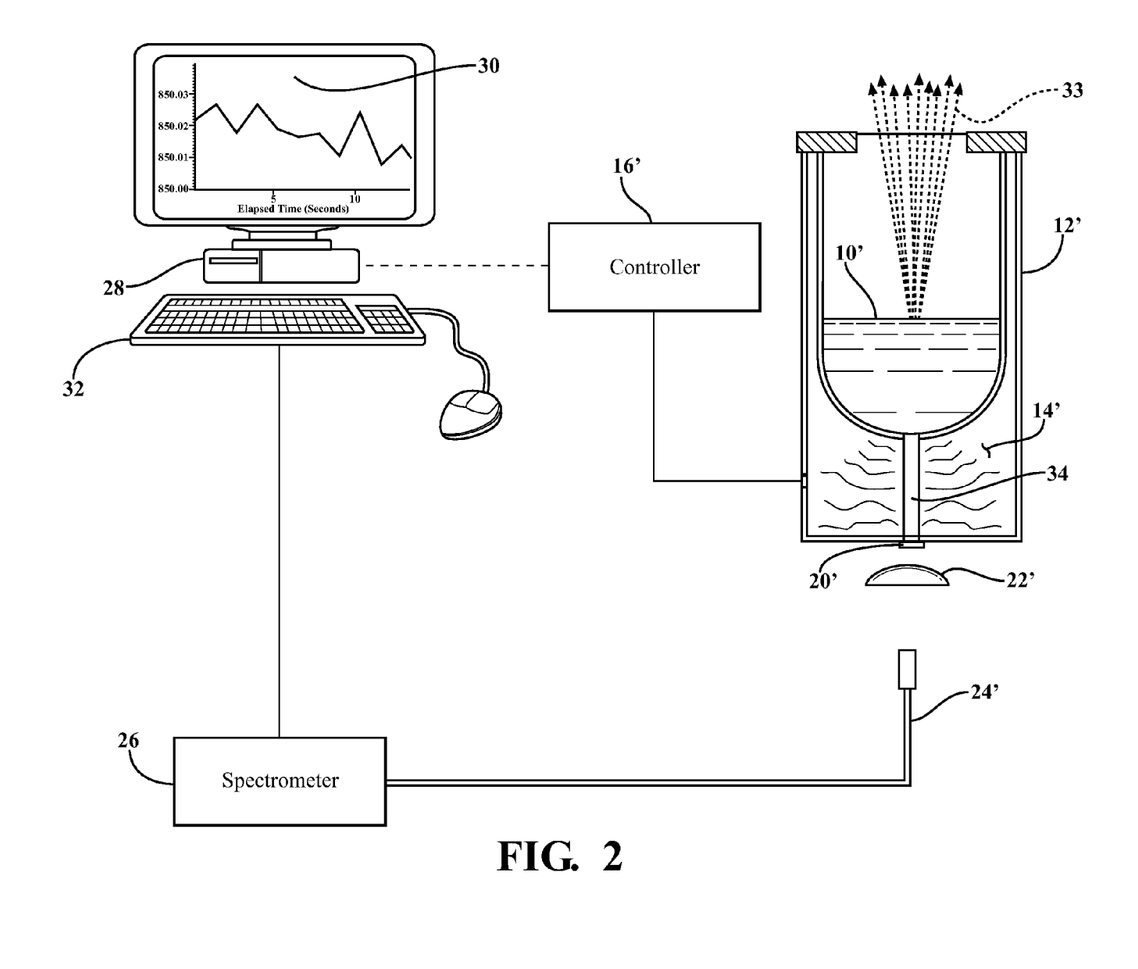
FIG. 2 is a schematic view of the temperature measurement system of this invention as might be used in the exemplary application of source cell temperature measurement, such as might be used in molecular beam epitaxy (MBE)

FIG. 2 describes an alternative application of this technology wherein, instead of monitoring a thin film wafer, the sample 10' is, in this instance, molten gallium, arsenic or other material that is used in molecular beam epitaxy (MBE) or other thin-film deposition applications. Prime designations are used to indicate features corresponding to those introduced in connection with FIG. 1. The sample 10' reaches a temperature inside a melting crucible 12' to achieve a molten state. An appropriate heating element 14' is switched on and off by a controller 16'. In this example, broken arrows 33 represent liberated metal molecules as used in a deposition process. A quartz rod 34 directs thermal radiation (not shown) through the viewport 20' toward a lens 22'. The lens 22' focuses the emitted radiation onto optical fiber 24' which is carried to a spectrometer 26. Raw spectra data produced by the spectrometer 26 and analyzing the radiation emitted from the sample 10' is processed by the computer 28 to determine, in substantially real time, the temperature of the sample 10'.

In both examples of FIG. 1 and FIG. 2, the computer 28 may, optionally, be connected to the controller 16, 16' in a feedback loop so that temperature corrections via heater 14, 14' can be made in response to temperature measurements so that sample 10, 10' temperatures correspond with manufacturing specifications. In this manner, the subject invention may be used either as a stand-alone temperature measurement instrument, or as part of a manufacturing system using temperature determinations in connection with process controls. Furthermore, it should be understood that non-contact temperature measurement applications exist in many industries and processes, and are not limited to thin film deposition and molecular beam epitaxy applications, which have been described here for purposes of illustration only.

The subject invention, as implemented through the computer 28, comprises a novel temperature monitoring technique in which radiation intensity (i.e., blackbody emission) across a broad wavelength range (e.g., 900-1,700 nm) is used to calculate temperatures in substantially real time. More particularly, this technique is based on the real time fitting of the entire radiation intensity versus wavelength curve obtained from a sample 10, 10' to a suitable mathematical equation that defines ideal blackbody spectral radiance (I) as a non-linear function of wavelength ($\lambda$) and temperature (T). The most accurate mathematical equation known to date is based on Planck's law and can be expressed as follows:

$$I(\lambda, T) = A \frac{2hc^2}{\lambda^5} \frac{1}{e^{hc/\lambda k_B T} - 1} + C$$

Where:
I($\lambda$,T)=spectral radiance as a function of wavelength and temperature
T=the temperature in Kelvin
$\lambda$=the wavelength
A=the amplitude variable which is a product of the emissivity of the sample and a tooling factor
h=Planck's constant
c=the speed of light
$k_B$=Boltzmann's constant
e=the base of the natural logarithm and
C=a constant offset or background.

This mathematical equation expresses a unique ideal blackbody spectral radiance curve I($\lambda$,T) for any given temperature. Thus, as shown in FIG. 3, a plot of the spectral radiance of a blackbody for several temperatures is shown. Note that the curves never cross, and that the peak of each curve shifts to progressively shorter wavelengths as the temperature increases. Spectral radiance (I) is the fundamental measure of the amount of light emitted from a diffuse source that can reach a detector 26. Spectral radiance (I) is defined as the emitted power per unit area of emitting surface, per unit solid angle, per unit wavelength.

According to Planck's law (above), the spectral radiance I($\lambda$,T) of a blackbody at a given temperature is predictable for any given temperature. Spectra acquired from a sample 10, 10' is thus fit to this equation so as to select one ideal blackbody spectral radiance curve I(λ,T) that most closely corresponds to the spectra data. The temperature associated with the corresponding ideal blackbody spectral radiance curve I(λ,T) can then be adopted as the absolute temperature of the sample 10, 10'. Generally, three adjustable parameters exist in the mathematical equation based on Planck's law: the temperature T (which is in Kelvin), the amplitude A, and an optional constant C. The amplitude A is the product of the so-called "tooling factor" and the material's emissivity. The tooling factor incorporates system-dependent geometrical and sensitivity factors, and therefore is usually determined empirically. The tooling factor can be defined, therefore, as a function of the amplitude, or written simply f(A).

The amplitude variable A can be determined by calibrating to a blackbody curve at a known temperature, such as from a band edge measurement or RHEED transition. In this case, the temperature T is held fixed, and the amplitude A is allowed to vary to obtain the best fit. The tooling factor can then be determined by dividing the resulting amplitude value A by the material's emissivity. Once the tooling factor is known, subsequent blackbody fits can be performed in real-time during radiation data 18 acquisition. In this case, the amplitude value A is held fixed, i.e., locked-in, and the temperature T is allowed to vary to obtain the best fit. This approach assumes that emissivity is constant over time.

Alternatively, in cases where these assumptions are not valid, a free fit can be performed. In a free fit operation, both the amplitude variable A and the temperature variable T of the Planck distribution are allowed to vary in order to obtain the best fit. In principle, this approach is insensitive to viewport coatings, as the tooling factor (which is a function of the amplitude A), can vary over time to accommodate the decrease in signal intensity. However, in practice the best results are typically obtained by calibrating the amplitude value, then storing the value to be re-used in subsequent temperature measurements. If the calibration temperature is not known from some other means, such as oxide desorption, band edge, etc., then a free fit can be done to determine it. Following this, the tooling factor (i.e., the amplitude variable A) can be determined in the manner described.

In either case, the measurement accuracy can be improved by first performing a flat field correction on the spectrometer 26. A flat field correction corrects for variations in the spectrometer response with wavelength. Ideally, the response of any spectrometer would be constant across the entire spectrum, i.e., the spectrometer has a flat field. In real life, however, spectrometers 26 will have a spectral response that can vary significantly from one detector to the next, as well as a function of wavelength. This is due to the inherent response of the optical components, as well as that of the sensor itself.

Figure 5:
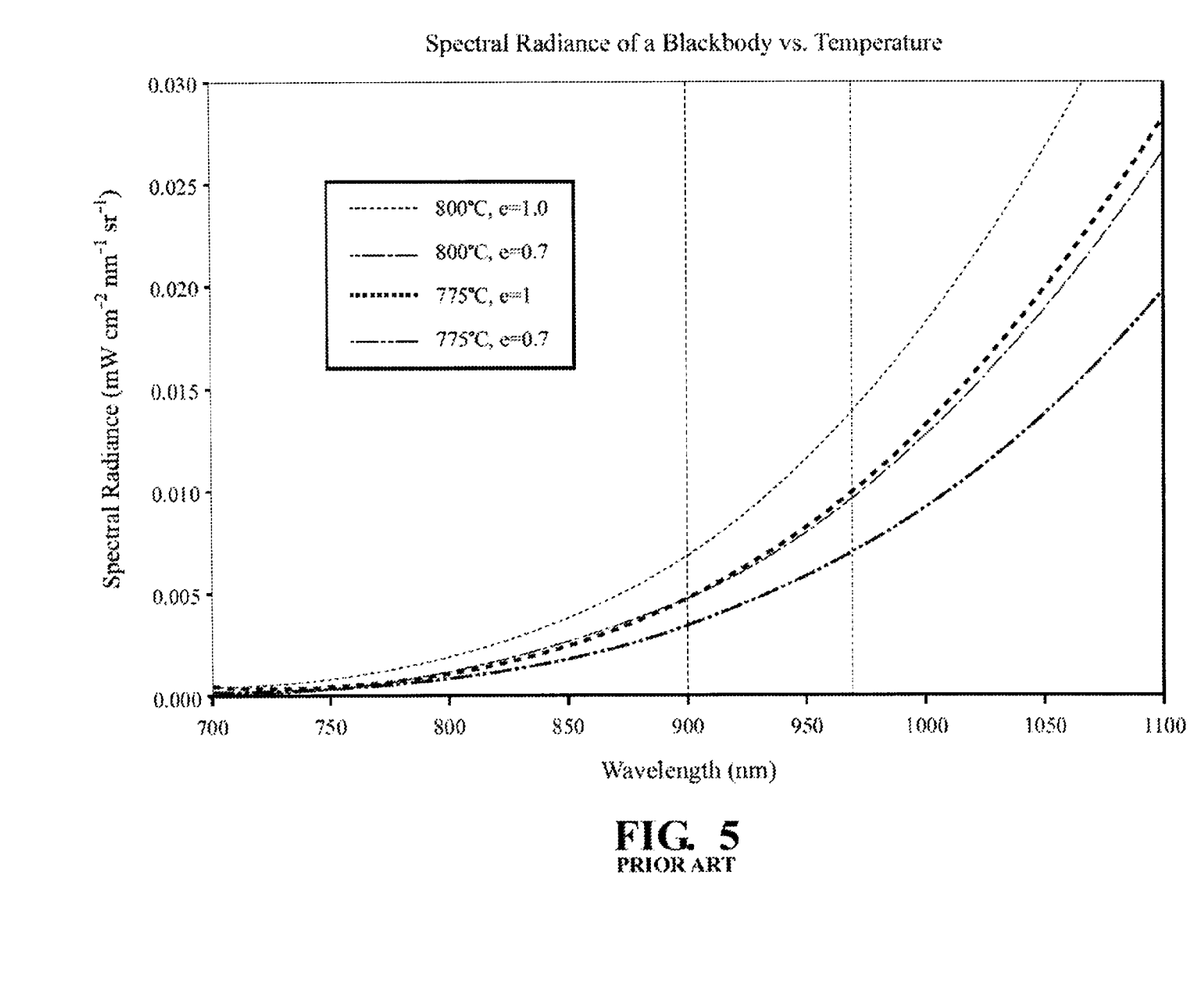
FIG. 5 is another set of spectral radiance curves demonstrating the effects of emissivity variations on the spectral radiance curves for different samples, and thereby indicative of shortcomings that exist in standard pyrometry techniques.

FIG. 5 indicates how the intensity varies with emissivity. As a result, relying on the intensity in a narrow range of wavelengths, as is the case of standard pyrometry, can lead to erroneous results if the emissivity is not accurately known. As illustrated, the two middle curves have nearly identical intensities over the 900-970 nm window typically used in NIR pyrometry. Therefore, a pyrometric measurement performed according to prior art techniques would indicate nearly identical temperatures; however, looking at a larger portion of the spectrum reveals that the curves and their associated temperatures are, in fact, significantly different. The intensities happen to match in the particular wavelength window because the emissivity values are not the same.

Figure 6:
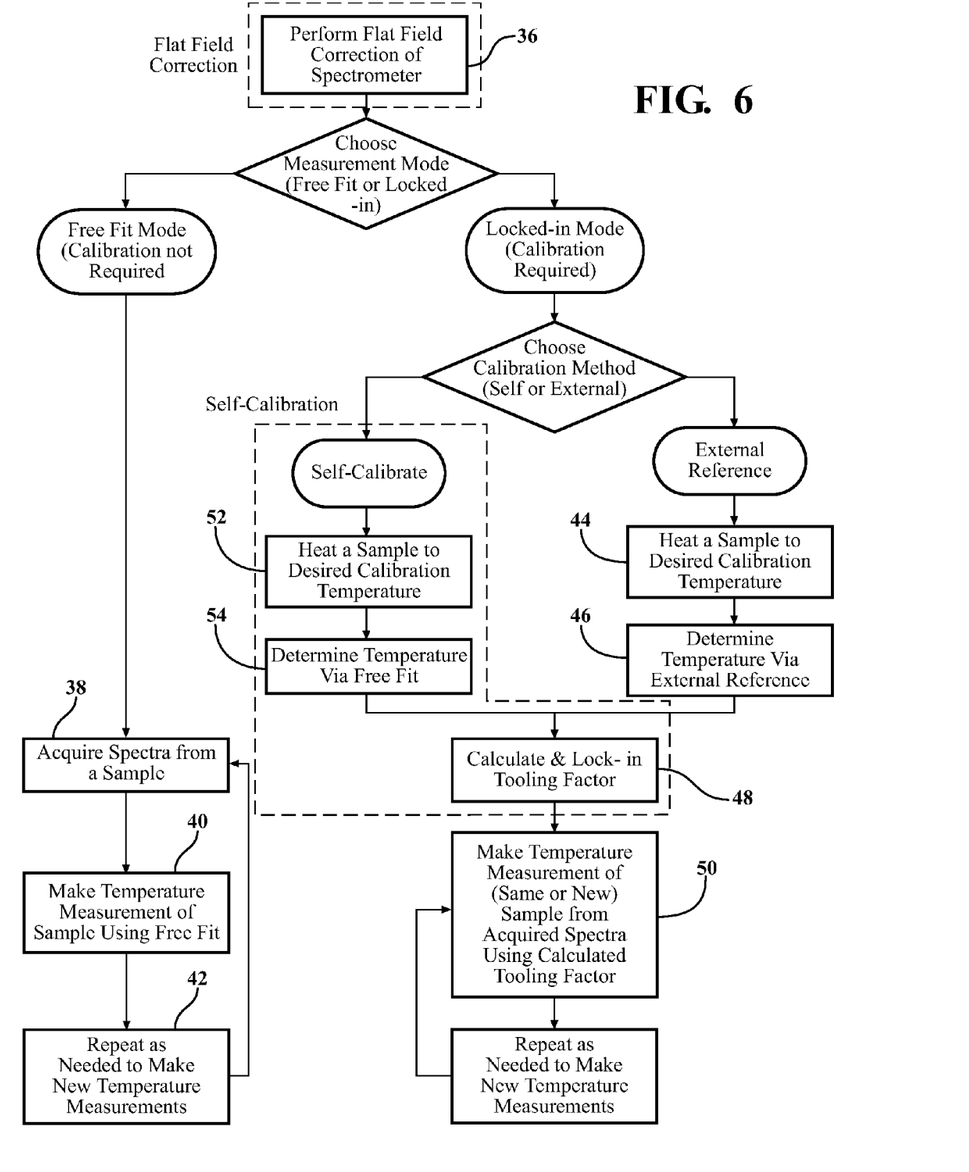
FIG. 6 is a simplified flow chart describing the process steps of a temperature measurement system according to one embodiment of the invention.

FIG. 6 provides, in simplified form, a flow chart describing the different operational modes and choices associated with conducting non-contact temperature measurements using the methods and systems of this invention. As stated previously, an optional but preferred initial step in the process is to perform a flat field correction of the spectrometer 26. This step corresponds to function block 36 in the process diagram. As stated previously, the purpose of the flat-field correction is to correct for variations in the spectrometer response with wavelength. Using a source that has a known output spectrum, a correction factor can be generated in order to achieve this. A blackbody source at a known temperature works well for this application because the exact spectrum can be calculated from Planck's law. This correction factor is defined as the ratio of the raw or uncorrected spectrum to a Planck distribution. The raw spectrum is then divided by this correction factor. The following equations restate the procedure for flat field correction:

$$\text{Correction Factor} = \frac{\text{Raw}}{\text{Planck}} \quad \text{Corrected Data} = \frac{\text{Raw}}{\text{Correction Factor}}$$

Figure 7:
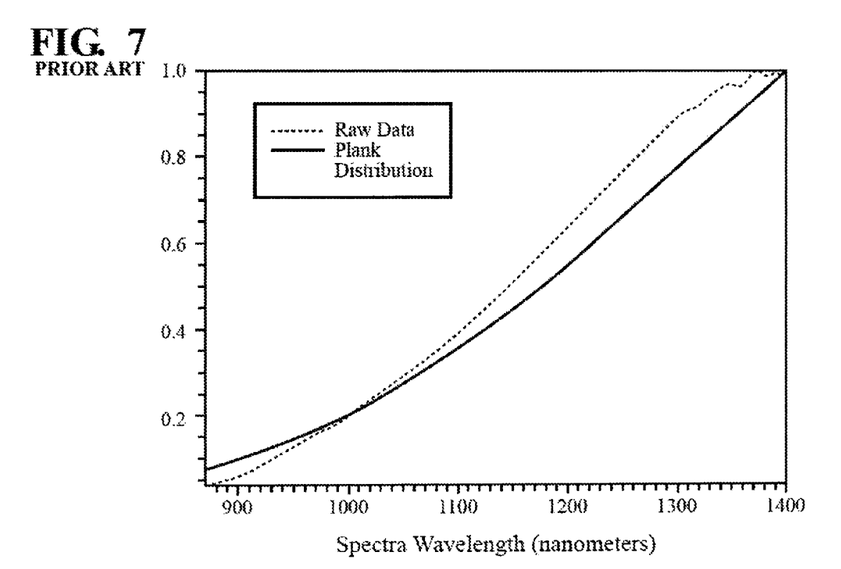
FIG. 7 is a diagram comparing uncorrected, i.e., raw, spectra collected in a spectrometer versus an ideal Planck distribution.
Figure 8:
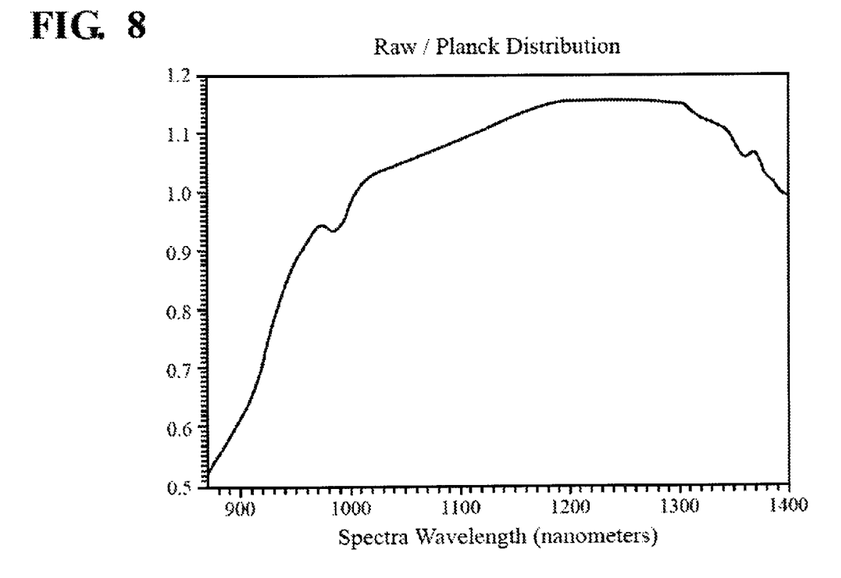
FIG. 8 is a view as in FIG. 7 but showing the calculated correction factor as a function of wavelength.

FIG. 7 for example describes a raw data collection acquired by a spectrometer 26 when using a source that has a known output spectrum. In this case, the source is a blackbody source of a known temperature for which its spectral radiance is known. This is shown in the solid line curve of FIG. 7. However, the raw spectra data collected by the spectrometer 26 indicates the broken line which represents variations in the spectrometer response as a function of wavelength. The method for calculating a correction factor, as defined above, provides a technique in which the imperfect spectrometer response can be more closely tuned to the ideal distribution as predicted by Planck's law. FIG. 8 is a diagram showing the calculated correction factor as a function of wavelength. By comparing FIGS. 7 and 8, it can be seen that a correction factor of 1.0 exists at each point the raw data curve crosses the ideal Planck distribution. In other words, for those wavelengths that appear at approximately 1,010 and 1,400 nanometers, no correction is needed. However, when the spectrometer response falls below an ideal distribution, a correction factor of less than 1.0 is required. When the raw spectral data indicates above an ideal Planck distribution, a correction factor greater than 1.0 is needed.

Figure 9:
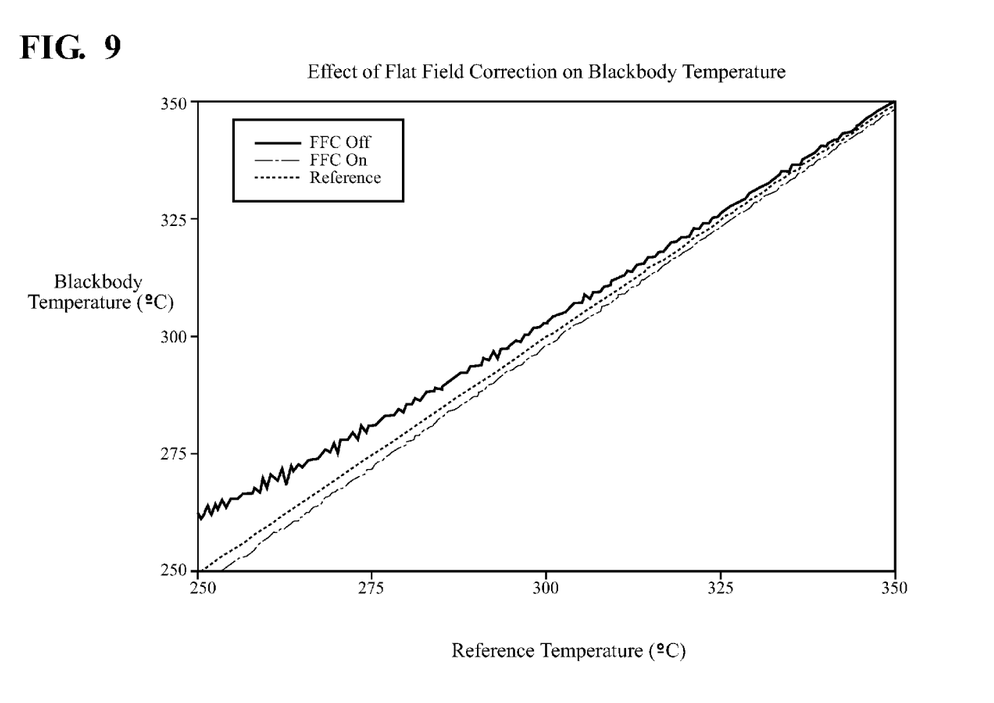
FIG. 9 is a chart showing blackbody temperature versus reference temperature measurements in conditions where a spectrometer is flat field corrected and also when not flat field corrected.

As a result of applying the flat field correction factor, more accurate temperature measurements can be achieved. FIG. 9, for example, shows a graph created from sample data in which temperature calculations using blackbody fitting routines yield skewed temperature results, particularly in the lower temperature ranges. However, by utilizing a flat field correction routine, the ability to more accurately determine temperature is substantially improved.

Returning to FIG. 6, once a flat field correction 36 has been performed, the system may be configured to permit a choice between two different kinds of measurement modes: either free fit or locked-in mode. As described previously, free fitting can be used in cases where both the amplitude A and temperature T variables of the Planck distribution are allowed to vary. A free fitting approach is generally insensitive to viewport coatings, as the amplitude variable A, or more specifically the tooling factor, can vary over time to accommodate the decrease in signal intensity. As a result, free fit mode does not require a calibration step, but may not provide temperature measurements as accurately as could be expected when operating in an amplitude value A "locked-in" mode. Thus, in free fit mode, spectra data is acquired from a sample 10 at step 38 and then, without specifying an amplitude value A, a temperature measurement of the sample is made using a free fit approach 40. The acquired, preferably corrected, wavelength-dependent spectra is compared to the mathematical equation defining ideal blackbody spectral radiance, i.e., Planck's law, and the one ideal blackbody radiance curve which most closely corresponds to the spectra data is selected, along with its associated amplitude value A, but its amplitude value A is not stored for subsequent free fit measurements. This selection process preferably includes the use of a non-linear least squares fitting calculation, which is a standard analytical approach in data fitting applications. This free fitting step 40 can be repeated (step 42) as many times as needed in order to make subsequent temperature measurements, each time without specifying in advance an amplitude value A nor storing the amplitude value from any previous measurement. Accordingly, with every free fit temperature measurement the amplitude A (as well as the temperature T) remains a variable, rather than a predetermined value.

As an alternative to the free fit mode described above, the system of this invention can also operate in a locked-in mode for the amplitude A in which a preliminary calibration step is required. Locked-in mode can be defined as a temperature measurement procedure where a stored value for the amplitude A is used in connection with the step of fitting the acquired spectra data to the ideal blackbody equation. This calibration step can be performed using either internal (i.e., self-calibration) methods or using an external reference. When operating in an external reference mode, a sample 10 is heated to a desired calibration temperature, as indicated at step 44. The temperature of the sample 10 is determined by some external reference at step 46, which may be a band edge measurement, a RHEED transition, or some other method. Data collected via the spectrometer 26 allows the amplitude value A, and in particular the tooling factor that is a function of A, to be determined, stored, and then locked-into the mathematical equation that defines ideal blackbody spectral radiance (I). In other words, by determining the amplitude value A from a known spectral radiance curve at a known temperature, it is possible to then adopt this amplitude value A together with its tooling factor component as a constant to be used in subsequent temperature measurements. This equates to "locking in" the tooling factor and reusing this value for subsequent measurements. Function block 48 represents this calculate-and-lock-in step. Thus, once the amplitude value A is locked in (step 48), subsequent temperature measurements can be made of either the same or a new sample from acquired spectra with only the temperature T being allowed to vary from one measurement event to the next. This is represented in step 50. Of course, the steps of acquiring spectra data and making new measurements 50 is repeated as frequently and as often as needed throughout the manufacturing process, each time re-using the stored amplitude value A.

Considering the alternative self-calibration method of the system, it is possible to simply heat a sample 10 to some desired calibration temperature (step 52) and then make a temperature determination via a free fitting operation 54 as described in connection with step 40 above. Once temperature is determined by this free fitting method, the tooling factor, as a function of amplitude A, can be determined and locked in with subsequent temperature measurements 50 made, not by free fitting, but by using the determined amplitude value A. Accordingly, the invention provides an extremely versatile technique for calibrating a spaced non-contact temperature measurement device by determining the amplitude value A using a free fit temperature determination 54. As a result, the system can be self-calibrated on the fly without the time and tedium associated with calibration using external references. Generally, the self-calibration technique can be rendered more accurate or reliable if the self-calibration temperature is relatively high. For example, sample temperatures above 700° C. are expected to provide substantially better and more reliable results than when conducted at lower temperatures due to the nature of the spectral radiance curve.

Accordingly, the methods of this invention allow sample radiation intensity 18 to be collected anywhere within the range of a solid state spectrometer 26, and then integrated over any desired wavelength range. The method includes fitting the shape of the data curve from acquired spectra to Planck's equation over a range of wavelengths in substantially real time by using a non-linear least squares fitting routine. By fitting the acquired spectra curve to Planck's equation, i.e., the ideal blackbody spectral radiance curve $I(\lambda,T)$, the resulting temperature calculation is only dependent upon changes that affect the entire spectral range, which would lead to a shift in the entire emission curve. Localized intensity changes of particular emission wavelengths have little to no effect on the curve fitting position itself and, subsequently, temperature remains stable and accurate.

Because radiation 18 is collected over a wide spectral range (typically material-dependent), the integrated magnitude of the collected signal, when accumulated over the appropriate integration period, is typically very high. The techniques of this invention are not limited to a narrow band of intensity collection as is the case with standard pyrometry. Rather, fitting routines like those described above have proven to be very stable for real-time fitting of Planck's equation, even at low sample temperatures. This leads to high temperature resolution capabilities. For example, temperature resolution better than 0.05° C. is easily obtained in temperatures above 850° C. Even at temperatures below 400° C., temperature resolution has been shown to surpass 0.5° C. Typical data acquisition rates are between 1-100 msec for these temperatures, allowing for spatially-resolved temperature measurements even during high speed sample movements.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for calibrating a spaced non-contact temperature measurement device by observing thermally-emitted radiation from a sample, said method comprising the steps of:
   A. providing a spectrometer;
   B. providing a sample to be measured;
   C. heating the sample to an unknown self-calibration temperature;
   D. acquiring wavelength-dependent spectra from the heated sample in the infrared (IR) portion of the spectrum with the spectrometer;
   E. providing a mathematical equation defining ideal blackbody spectral radiance (I) as a non-linear function of wavelength ($\lambda$) and temperature (T), the mathematical equation including an unsolved amplitude variable (A), whereby the mathematical equation expresses a unique ideal blackbody spectral radiance curve $I(\lambda,T)$ for any given temperature;
   F. selecting one ideal blackbody spectral radiance curve $I(\lambda,T)$ closely corresponding to the spectra data, the corresponding ideal blackbody spectral radiance curve $I(\lambda,T)$ being associated with an absolute temperature and an amplitude value (A);

G. adopting the absolute temperature of the corresponding ideal blackbody spectral radiance curve I(λ,T) for the unknown temperature of the sample; and H. storing the amplitude value (A);

I. then making a new sample temperature measurement by the steps of:
1) acquiring new wavelength-dependent spectra from a heated sample in the infrared (IR) portion of the spectrum with the spectrometer;
2) and calculating a new sample temperature by solving the mathematical equation using the newly acquired spectra and the stored amplitude value (A) as a known factor.

2. The method of claim 1 wherein said step of providing a mathematical equation includes applying the formula:

$$I(\lambda, T) = A \frac{2hc^2}{\lambda^5} \frac{1}{e^{hc/\lambda k_B T} - 1} + C$$

Where:
I(λ,T)=spectral radiance as a function of wavelength and temperature
T=the temperature in Kelvin
λ=the wavelength
A=the amplitude variable which is a product of the emissivity of the sample and a tooling factor
h=Planck's constant
c=the speed of light
$k_B$=Boltzmann's constant
e=the base of the natural logarithm, and
C=a constant offset or background.

3. The method of claim 1 wherein said step of selecting one ideal blackbody spectral radiance curve I(λ,T) closely corresponding to the spectra data includes fitting the spectra data to the mathematical equation using a non-linear least squares fitting calculation.

4. The method of claim 1 wherein said step of calculating a new sample temperature occurs in substantially real-time with said step of acquiring new wavelength-dependent spectra.

5. The method of claim 1 wherein said step of providing a spectrometer includes providing a solid state spectrometer.

6. The method of claim 1 wherein said step of acquiring wavelength-dependent spectra includes collecting raw spectra and then correcting the raw spectra by a predetermined correction factor, and said step of acquiring new wavelength-dependent spectra includes collecting new raw spectra and then correcting the new raw spectra by the same predetermined correction factor.

7. The method of claim 6 further including the step of determining the predetermined correction factor by flat field adjusting the spectrometer prior to said step of acquiring spectra.

8. The method of claim 7 wherein said step of flat field adjusting the spectrometer includes receiving with the spectrometer a spectral radiance from a known blackbody reference source and then comparing the spectral radiance to the mathematical equation solved for the spectral radiance.

9. The method of claim 1 wherein said step of heating the sample to an unknown self-calibration temperature includes heating the sample above 700° C.

10. The method of claim 1 wherein said step of making a new sample temperature measurement includes re-measuring the same sample provided from step B.

11. A method for making precise non-contact temperature measurements of a sample based on its thermally-emitted radiation, said method comprising the steps of:

A. providing a spectrometer;

B. providing a sample to be measured;

C. acquiring wavelength-dependent spectra from the heated sample in the infrared (IR) portion of the spectrum with the spectrometer;

D. providing a mathematical equation defining ideal blackbody spectral radiance (I) as a non-linear function of wavelength (λ) and temperature (T), whereby the mathematical equation expresses a unique ideal blackbody spectral radiance curve I(λ,T) for any given temperature;

E. selecting one ideal blackbody spectral radiance curve I(λ,T) closely corresponding to the spectra data, the corresponding ideal blackbody spectral radiance curve I(λ,T) being associated with an absolute temperature;

F. adopting the absolute temperature of the corresponding ideal blackbody spectral radiance curve I(λ,T) for the unknown temperature of the sample; and G. prior to said selecting step, correcting the spectra by a predetermined correction factor to correct for any variations in the spectrometer response with wavelength.

12. The method of claim 11 wherein said step of correcting the spectra includes determining the predetermined correction factor by flat field adjusting the spectrometer prior to said step of acquiring spectra.

13. The method of claim 11 wherein said step of flat field adjusting the spectrometer includes receiving with the spectrometer a spectral radiance from a reference source and then comparing the spectral radiance to the mathematical equation solved for the spectral radiance.

14. The method of claim 13 wherein said step receiving a spectral radiance from a reference source includes receiving blackbody spectra from a known blackbody reference source.

15. The method of claim 11 wherein said step of providing a mathematical equation includes applying the formula:

$$I(\lambda, T) = A \frac{2hc^2}{\lambda^5} \frac{1}{e^{hc/\lambda k_B T} - 1} + C$$

Where:
I(λ,T)=spectral radiance as a function of wavelength and temperature
T=the temperature in Kelvin
λ=the wavelength
A=the amplitude variable which is a product of the emissivity of the sample and a tooling factor
h=Planck's constant
c=the speed of light
$k_B$=Boltzmann's constant
e=the base of the natural logarithm, and
C=a constant offset or background.

16. The method of claim 15 wherein said step of selecting one ideal blackbody spectral radiance curve I(λ,T) closely corresponding to the spectra data includes fitting the spectra data to the mathematical equation using a non-linear least squares fitting calculation.

17. The method of claim 15 further including making a new sample temperature measurement after said adopting step by acquiring new wavelength-dependent spectra from a heated sample in the infrared (IR) portion of the spectrum with the spectrometer and then correcting the new raw spectra by the same predetermined correction factor.

18. The method of claim 17 wherein said step of making a new sample temperature measurement includes calculating a new sample temperature by calculating the tooling factor (f(A)) using the mathematical equation and solving the mathematical equation using the calculated tooling factor (f(A)).

19. The method of claim 17 wherein said step of calculating a new sample temperature occurs in substantially real-time with said step of acquiring new wavelength-dependent spectra.

20. A method for making precise non-contact temperature measurements of a sample based on its thermally-emitted radiation, comprising the steps of:
   A. providing a solid state spectrometer;
   B. establishing a correction factor for the spectrometer by flat field adjusting;
   C. providing a sample to be measured;
   D. heating the sample to an unknown temperature;
   E. acquiring raw, wavelength-dependent, spectra from the heated sample in the IR portion of the spectrum with the spectrometer;
   F. correcting the raw spectra by the correction factor to produce corrected spectra data;
   G. providing a mathematical equation defining ideal blackbody spectral radiance (I) as a non-linear function of wavelength ($\lambda$) and temperature (T), the mathematical equation including an amplitude variable (A), whereby the mathematical equation expresses a unique ideal blackbody spectral radiance curve $I(\lambda,T)$ for any given temperature;
   H. comparing the corrected spectra data to the mathematical equation to find the best fit to one specific ideal blackbody spectral radiance curve $I(\lambda,T)$ associated with an absolute temperature and a specific amplitude value (A);
   I. adopting the absolute temperature of the best fit ideal blackbody spectral radiance curve $I(\lambda,T)$ for the unknown temperature of the sample without knowing the value of A;
   J. storing the amplitude value (A);
   K. locking the stored amplitude value (A) into the mathematical equation;
   L. making at least one new sample temperature measurement by the steps of:
      1) acquiring new wavelength-dependent spectra from a heated sample in the infrared (IR) portion of the spectrum with the spectrometer;
      2) correcting the new spectra by the correction factor; and
   M. calculating a new sample temperature by best fitting to the mathematical equation using the newly acquired spectra and the stored amplitude value (A) as a known factor.

* * * * *